No. 779,030. Patented January 3, 1905.

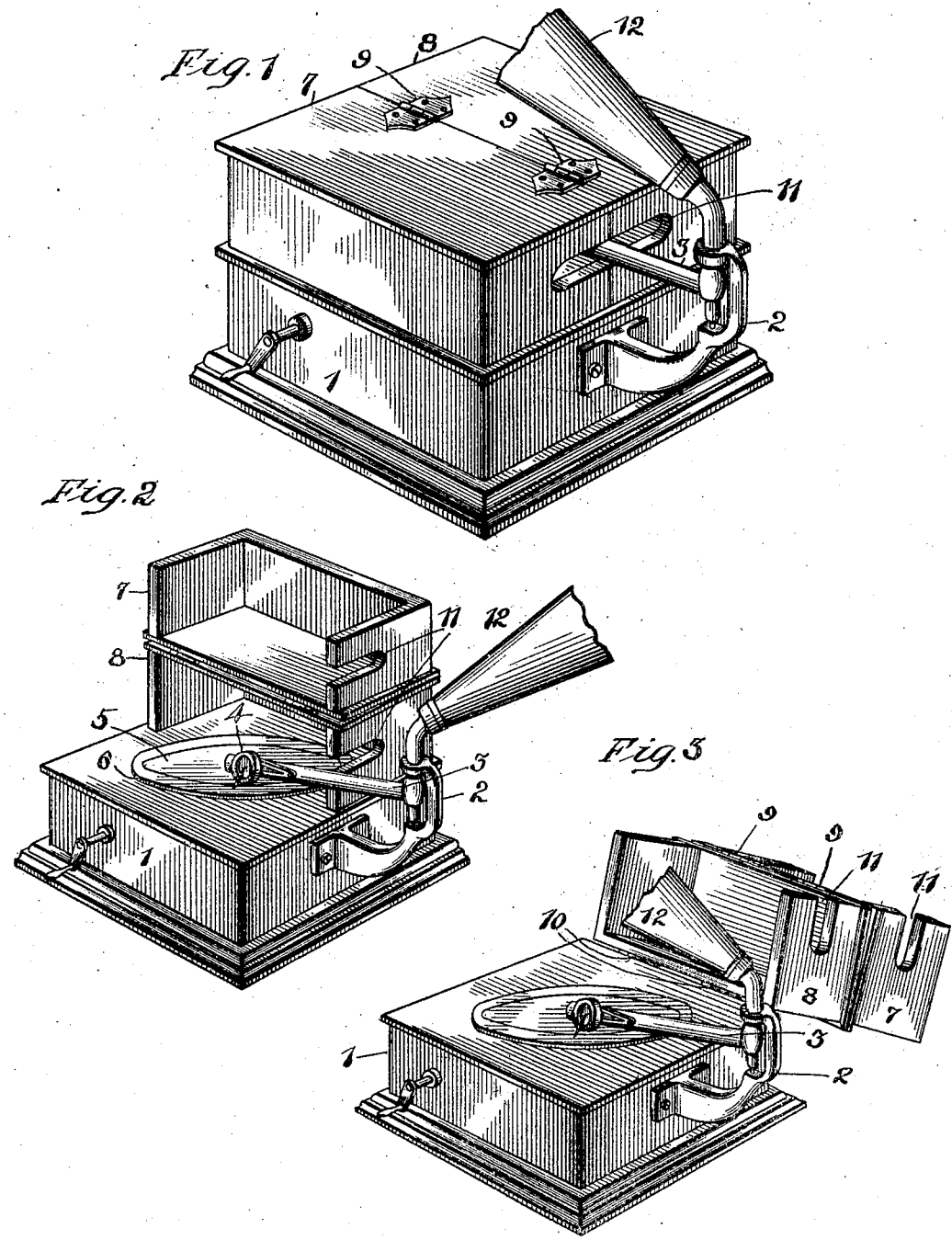

UNITED STATES PATENT OFFICE.

LEON F. DOUGLASS, OF PHILADELPHIA, PENNSYLVANIA, ASSIGNOR TO VICTOR TALKING MACHINE COMPANY, A CORPORATION OF NEW JERSEY.

CABINET FOR TALKING-MACHINES.

SPECIFICATION forming part of Letters Patent No. 779,030, dated January 3, 1905.

Application filed September 21, 1903. Serial No. 174,014.

*To all whom it may concern:*

Be it known that I, LEON F. DOUGLASS, a citizen of the United States, and a resident of Philadelphia, State of Pennsylvania, have invented certain new and useful Improvements in Cabinets for Talking-Machines, of which the following is a full, clear, and complete disclosure.

The object of my invention is to provide a talking-machine cabinet within which the principal parts of the talking-machine may be inclosed when the machine is not in use and also within which the sound-producing parts of the machine may be inclosed when the machine is in operation, so as not only to prevent the delicate parts from becoming injured, but also to prevent superfluous and disagreeable sounds from mingling with the vibrations produced by the talking-machine.

In general my invention consists in placing a casing upon the top of the usual motor casing or box, said upper casing being divided centrally, so that one part will turn or swing back upon the other, and being provided with a slot within which the arm of the talking-machine is adapted to freely reciprocate.

For a full, clear, and exact description of my invention reference may be had to the following specification and to the accompanying drawings, forming a part thereof, in which—

Figure 1 shows a perspective view of my improved cabinet, the parts of the casing being closed. Fig. 2 is a perspective view similar to Fig. 1, but showing the front part of the casing turned back. Fig. 3 is a perspective view showing the upper part of the casing entirely removed.

Referring to the drawings, the numeral 1 indicates the usual casing for the talking-machine motor, which has attached at one side thereof the bracket or supporting-arm 2. This bracket 2 is adapted to support and form a vertical bearing for the hollow arm 3 of the talking-machine proper. The inner end of the arm 3 carries a vertically-pivoted sound-box 4, which is adapted to coöperate with the sound-record 5, carried upon the turn-table 6, the latter being rotated by the usual spring-motor within the casing 1.

The numerals 7 and 8 represent two similar rectangular portions of a casing or cover which rests upon the top of the motor-casing 1 and are hinged together at their inner edges by the hinges 9. The rear portion 8 of this casing is also hinged to the motor-casing 1, as shown at 10. In the adjacent vertical sides of each of the parts 7 and 8 of the removable casing are provided openings 11, which when the casing is closed form a continuous slot within which the arm 3 may oscillate when the casing is closed, as shown in Fig. 1. This slot is made of sufficient length to allow the arm to swing to the extreme limits of the path within which the stylus or needle of the sound-box travels when the machine is in operation.

In operation the casing is first opened, as shown in Fig. 2, which allows the sound-record to be placed upon the turn-table, the needle of the sound-box to be adjusted to its groove, and the motor to be started. The casing is then closed or placed in a position shown in Fig. 1, after which the machine is allowed to operate in the usual manner until the particular selection contained in the record is finished. The casing is then manipulated in a manner reverse to that above described.

If it is desired to have the top of the motor-casing 1 completely free and unobstructed, the whole casing may be thrown back, as shown in Fig. 3, which allows the turn-table and any other of the upper parts of the motor-casing to be made easily accessible. The amplifying-horn 12 being pivoted on the support or bracket 2, the same may be turned in any direction to throw the sound wherever desired and also may be moved to extend outwardly, as shown in Fig. 2, so that the portions of the casing 7 and 8 may be swung backward without interfering with said horn.

By providing a casing such as above described the operative parts of the machine which produce the sound are not only protected and kept free from dust at all times, but when the machine is in operation the disagreeable noises or sounds which may sometimes be produced by the sound-box or by the needle passing over the material of the record are obviated and made unobjectionable.

The casing when closed has a neat and attractive appearance and is adapted to be placed in a parlor or drawing-room with the same pleasing effect as is produced by other kinds of music-boxes.

Having thus described the nature of my invention, what I claim, and desire to protect by Letters Patent of the United States, is—

1. In a cabinet for talking-machines, comprising a motor-casing, a removable cover or casing carried by said motor-casing and having an opening therein, reproducing mechanism supported outside of and passing through said opening and means to allow the removal of said cover without displacing said reproducing mechanism.

2. A cabinet for talking-machines, comprising a motor-casing, a removable cover or casing carried by said motor-casing and having a slot therein, reproducing mechanism supported outside of said cover and passing through said slot, the cover being made in parts so as to allow said reproducing mechanism to remain undisturbed when said cover having the slot is removed.

3. In a cabinet for talking-machines comprising a motor-casing, a removable cover or casing carried by said motor-casing and having a slot therein, reproducing mechanism supported outside of said cover by the motor-casing and passing through said slot, the cover being divided through said slot so as to provide an outlet from said slot so that said cover may be removed without displacing the reproducing mechanism.

4. A cabinet for talking-machines, comprising a motor-casing, a divided removable casing mounted upon said motor-casing, the parts of said divided casing having corresponding openings forming a slot to allow of the oscillation of the sound-box supporting-arm therein.

5. A cabinet for talking-machines, comprising a motor-casing, a centrally-divided removable casing hinged to said motor-casing, pivoted connections for the sections of said divided casing and corresponding elongated openings in the side of the said divided casing which form a slot when the casing is closed within which the sound-box supporting-arm of the talking-machine may oscillate.

In witness whereof I have hereunto set my hand this 2d day of September, 1903.

LEON F. DOUGLASS.

Witnesses:
R. E. KLENCK,
PETER HACEGALUP.